(12) United States Patent
Johas Teener et al.

(10) Patent No.: US 7,079,366 B1
(45) Date of Patent: Jul. 18, 2006

(54) POWER ON SEQUENCE AND GROUND FAULT INTERRUPTOR FOR HOT PLUG DEVICE

(75) Inventors: Michael D. Johas Teener, Santa Cruz, CA (US); Mitchell T. Orysh, Saratoga, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/749,809

(22) Filed: Dec. 31, 2003

(51) Int. Cl.
*H02H 9/00* (2006.01)
(52) U.S. Cl. .......................................... 361/56
(58) Field of Classification Search ................. 361/56, 361/119
See application file for complete search history.

(56) References Cited

U.S. PATENT DOCUMENTS 6,580,591 B1 *   6/2003  Landy ........................ 361/56
6,813,525 B1 *  11/2004  Reid et al. .................. 700/19

FOREIGN PATENT DOCUMENTS

EP   1 085 706 A2   3/2001
EP   1 085 706 A3  10/2002

OTHER PUBLICATIONS

Bregni et al., Jitter Testing Technique and Results at VC-4 Desynchronizer Output of SDH Equipment, *IEEE International Conference on Communications*, vol. 3, pp. 1407-1410, May 12, 1994.
"Information technology-Microprocessor systems—Control and Status Registers (CSR) Architecture for microcomputer buses", ANSI/IEEE Standard 1212, The Institute of Electrical and Electronics Engineers, Inc. pp. I-122, 1994 Edition, no month.
Bregni et al., Jitter Testing Technique and Results at VC-4 Desynchronizer Output of SDH Equipment, *IEEE Transactions on Instrumentation and Measurement*, vol. 44, Issue 3, pp. 675-678, Jun. 1995.
"IEEE Standard for a High Performance Serial Bus", IEEE Standard 1394-1995, Institute of Electrical and Electronics Engineers, Inc., pp. I-384, approved Jul. 22, 1996.
Shiwen et al., Parallel Positive Justification in SDH C_4 Mapping, *IEEE International Conference on Communications*, vol. 3, pp. 1577-1581, Jun. 12, 1997.
"AV/C Digital Interface Command Set General Specification, Rev. 3.0", 1394 Trade Association, pp. 4-5, 20-34, Apr. 15, 1998.

(Continued)

*Primary Examiner*—Ronald Leja
(74) *Attorney, Agent, or Firm*—Sierra Patent Group, Ltd.

(57) ABSTRACT

A protection circuit for use with a 1394-compliant network of devices is disclosed. The protection circuit comprises a power source, a switch connecting the protection circuit to power supplied by another device, a transceiver having at least one outbound data line, the at least one data line connected to an electrostatic discharge line, and a diode connected between the at least one outbound data line and the electrostatic discharge line.

1 Claim, 1 Drawing Sheet

OTHER PUBLICATIONS

Figure 1:
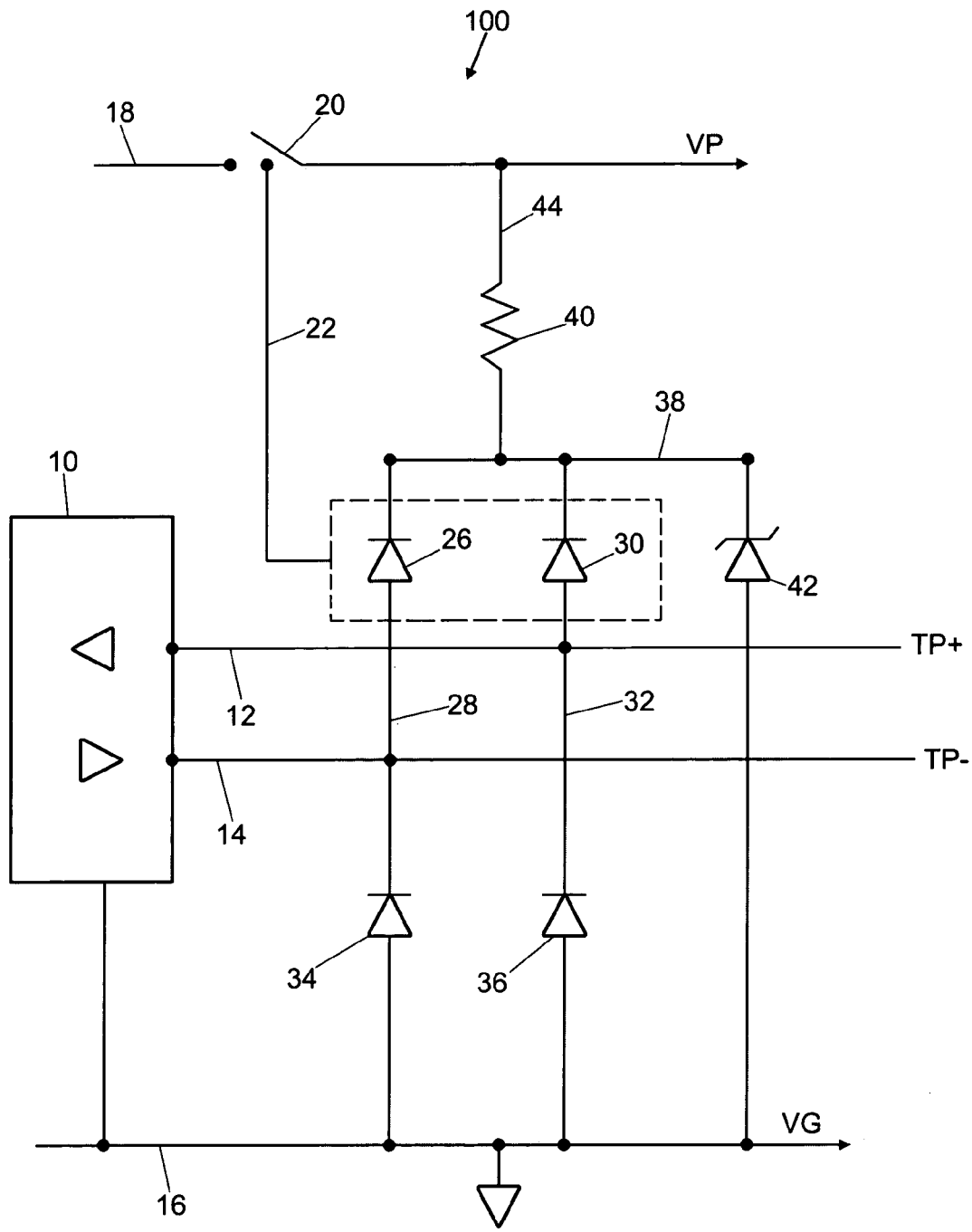

"Enhancements to the AV/C General Specification 3.0 Version 1.0FC1", 1394 Trade Association, pp. 4, 6-17, Nov. 5, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002 (no month).

* cited by examiner

POWER ON SEQUENCE AND GROUND FAULT INTERRUPTOR FOR HOT PLUG DEVICE

BACKGROUND OF THE INVENTION

In computing devices connected in accordance with the IEEE 1394 family of serial bus protocols, a circuit is formed on a shared cable from a power supply line, a return path that grounds the circuit, and data lines going to a transceiver. When the computing device is connected by a cable to another device, called a target device, data can be transferred between the two devices. The cable connects to another power supply and return path on the target device. Mechanically, it is desirable to make the ground connection first, then the power supply connection, and then the data lines connection. However, because of specific design problems, this order of connection is not always possible. Also, defective or dirty connectors and twisted cables can prevent this order of connection. When this desired order of connection is altered, current flow is changed and current runs through the transceiver. In some cases this additional current causes thermal overload that damages or destroys the transceiver.

A conventional approach to thermal overload issues in circuits is to provide a ground fault interrupter (GFI) in the circuitry of a device. A GFI utilizes a sensor that looks for balance between the AC signal going out over one twisted pair and the AC signal on the return path. While the device is operating, if the connecting cable is twisted and the sensor detects loss of current, the GFI shuts down the circuit, protecting components from permanent damage.

However, in the realm of portable computing devices described above, a conventional GFI is of no use, because the connecting cable has another connection (the shield on shielded cable) that goes to a separate ground connected elsewhere in the system. In order for convention GFIs to work in such an implementation, multiple GFIs would need to be placed at various locations and separate AC signals would have to be calculated into a single value. This also would require a resistor be placed somewhere in the shield. However, placing a resistor in the shield would violate a design constraint of the IEEE 1394 family of serial bus protocols, which requires the lowest resistance possible in the circuit existing on the shared cable. Thus there is a heartfelt need for a protection circuit that can protect transceivers from excessive current overload and failure.

SUMMARY OF THE INVENTION

The present invention solves the problem described above by providing a protection circuit that protects a transceiver from damage due to current overload. In an embodiment, by placing a diode on a data line connected to an electrostatic discharge (ESD) protection rail, a switch can be implemented that uses a sense line to detect excessive voltage and redirect current in the circuit to the ESD rail. If voltage above a desired threshold is detected on the data line, the current is allowed to pass through the diode. The switch operates quickly enough to protect the circuit from thermal overload. In an embodiment, intelligence can be programmed into the system including the switch of the present invention to poll for current detection. In an embodiment, the switch can be thrown immediately upon detection of excessive voltage. In another embodiment, current limiting can be implemented to allow tolerance of excessive voltage for a predetermined period of time. Such an embodiment accommodates cases of momentary current spikes and prevents the device from resetting.

The switch can be implemented in silicon or through conventional relays, depending on design requirements. The present invention has the advantage of using existing architecture of devices commonly connected in accordance with the IEEE 1394 family of serial bus protocols. The present invention provides "safe power" on a power source, such as VP in IEEE 1394-compliant terms. Safe power refers to voltage that is sufficiently low to preserve input of a remote device. Safe power also refers to current that is limited to a safe value. In another aspect, the present invention monitors current on power return, such as VG in IEEE 1394-compliant terms. In an embodiment, current on the power return line is monitored by measuring voltage drop across a sense resistor. When current on the power return equals current on the power source, then correct connection can be assumed, and full power is switched onto the power source. If correct operation of remote device cannot be confirmed, then disconnect power from remote device, wait for a period of time and then reapply full power. In an embodiment, correct operation of a remote device is confirmed by observing a correct bus reset sequence. If at any time the current to the power source does not equal power from the power return, then power is shut down and a restart sequence is executed. This sequence of acts can be monitored by software and/or firmware in a system incorporating the present invention.

Many other features and advantages of the present invention will become apparent upon reading the following detailed description, when considered in conjunction with the accompanying drawings, in which:

BRIEF DESCRIPTION OF THE DRAWING FIGURES

FIG. 1 illustrates a circuit in accordance with an embodiment of the present invention.

DETAILED DESCRIPTION OF THE INVENTION

Directing attention to FIG. 1, circuit 100 in accordance with the present invention is illustrated. Transceiver 10, in an embodiment, is a IEEE 1394-compliant PHY chip transceiver. Data line in 12, data line out 14, and ground line 16 are connected to transceiver 10. Power supply line 18 drives circuit 100, and is controllably connected to circuit 100 via switch 20. When switch 20 engages power supply line 18, fault detector connection line 22 powers diodes 26, connected to line 28, and diode 30, connected to line 32. Diodes 26, 30 connect lines 28, 32, respectively, to ESD rail 38. Protection diodes 34, 36 are connected between lines 28, 32, respectively, and ground line 16. Sense resistor 40, a high-value resistor, is also connected between the power source and ESD rail 38. Also connected to ESD rail 40 is Zeener diode 42.

Fault detection line 22, and diodes 26, 30 protect transceiver 10 from damage due to current overload. Switch 20 utilizes sense line 44 to detect excessive voltage and redirect current in circuit 100 to ESD rail 38. If voltage above a desired threshold is detected on lines 28, 32, current is allowed to pass through diodes 26, 30. Switch 20 operates quickly enough to protect circuit 100 from thermal overload. In an embodiment, intelligence can be programmed into a system including switch 20 of the present invention to poll for current detection. In an embodiment, switch 20 can be thrown immediately upon detection of excessive voltage. In another embodiment, current limiting can be implemented to allow tolerance of excessive voltage for a predetermined period of time. Such an embodiment accommodates cases of momentary current spikes and prevents the device from resetting.

Switch 20 can be implemented in silicon or through conventional relays, depending on design requirements. The present invention has the advantage of using existing architecture of devices commonly connected in accordance with the IEEE 1394 family of serial bus protocols. The present invention provides safe power on a power source, such as VP in IEEE 1394-compliant terms. Safe power refers to voltage that is sufficiently low to preserve input of a remote device. Safe power also refers to current that is limited to a safe value. When current on line 16 equals current on line 18, then correct connection can be assumed, and full power is switched onto the power source. If correct operation of remote device cannot be confirmed, then power from remote device is disconnected, the system incorporating circuit 100 waits for a period of time, and then reapplies full power. In an embodiment, correct operation of a remote device is confirmed by observing a correct bus reset sequence. If at any time the current to the power source does not equal power from the power return, then power is shut down and a restart sequence is executed. This sequence of acts can be monitored by software and/or firmware in a system incorporating the present invention.

What is claimed is:

1. A protection circuit for use with a 1394-compliant network of devices, the circuit comprising:

a first power source, said first power source supplying current to the protection circuit;

a switch connecting the protection circuit to current provided by a second power source while the protection circuit simultaneously receives current from the first power source, said second power source supplied by another device;

a transceiver having at least one outbound data line, the at least one data line connected to an electrostatic discharge line;

a diode connected between the at least one outbound data line and the electrostatic discharge line; and a sense line, said sense line disposed between the second power source and a sense resistor, said sense resistor connected to said electrostatic discharge line, the sense line and sense resistor operatively configured to direct current to said electrostatic discharge line if voltage from the second power source is detected above a threshold amount.

* * * * *